(12) United States Patent
Jones et al.

(10) Patent No.: US 7,738,500 B1
(45) Date of Patent: Jun. 15, 2010

(54) TCP TIMESTAMP SYNCHRONIZATION FOR NETWORK CONNECTIONS THAT ARE OFFLOADED TO NETWORK INTERFACE DEVICES

(75) Inventors: James Gregory Jones, Raleigh, NC (US); Clive M. Philbrick, San Jose, CA (US)

(73) Assignee: Alacritech, Inc., San Jose, CA (US)

( * ) Notice: Subject to any disclaimer, the term of this patent is extended or adjusted under 35 U.S.C. 154(b) by 1065 days.

(21) Appl. No.: 11/304,140

(22) Filed: Dec. 14, 2005

(51) Int. Cl.
*H04L 7/00* (2006.01)
(52) U.S. Cl. .................. 370/503; 370/508; 370/519
(58) Field of Classification Search .............. 370/503; 713/400
See application file for complete search history.

(56) References Cited

U.S. PATENT DOCUMENTS

| | | | |
|---|---|---|---|
| 4,366,538 A | 12/1982 | Johnson et al. | 364/200 |
| 4,485,455 A | 11/1984 | Boone et al. | 364/900 |
| 4,485,460 A | 11/1984 | Stambaugh | 365/203 |
| 4,589,063 A | 5/1986 | Shah et al. | 710/8 |
| 4,700,185 A | 10/1987 | Balph et al. | 340/825.5 |
| 4,991,133 A | 2/1991 | Davis et al. | 364/900 |
| 5,056,058 A | 10/1991 | Hirata et al. | 709/230 |
| 5,058,110 A | 10/1991 | Beach et al. | 370/85.6 |
| 5,097,442 A | 3/1992 | Ward et al. | 365/78 |
| 5,163,131 A | 11/1992 | Row et al. | 395/200 |
| 5,212,778 A | 5/1993 | Dally et al. | 395/400 |
| 5,280,477 A | 1/1994 | Trapp | 370/85.1 |
| 5,289,580 A | 2/1994 | Latif et al. | 395/275 |
| 5,303,344 A | 4/1994 | Yokoyama et al. | 395/200 |
| 5,412,782 A | 5/1995 | Hausman et al. | 395/250 |

(Continued)

FOREIGN PATENT DOCUMENTS

WO     WO 98/19412     5/1998

(Continued)

OTHER PUBLICATIONS

Article from Rice University entitled "LRP: A New Network Subsystem Architecture for Server Systems", by Peter Druschel and Gaurav Banga, 14 pages.

(Continued)

*Primary Examiner*—Donald L Mills
*Assistant Examiner*—Wanda Z Russell
(74) *Attorney, Agent, or Firm*—Silicon Edge Law Group LLP; Mark Lauer (57) ABSTRACT

A host computer running a TCP connection transfers the connection to a TCP offload network interface device (NID) which performs certain network processes, thereby reducing the load on the host CPU. The NID later transfers the connection back to the host. The host and the NID maintain separate timestamp clocks which provide timestamp values for connections using the TCP Timestamp option. Synchronization of the host and NID timestamp clocks can be realized by transfer of a clock value. The NID or host receives the transferred TCP connection and the transferred clock value, and decides whether to update its own clock to equal the transferred clock value, the decision being guided by the requirement to never allow the timestamp clock to run backward. Acceleration of the timestamp clocks is prevented so that RTT measurements are accurate. Synchronization of the host and NID timestamp clocks improves performance and reduces erroneous connection drops.

20 Claims, 3 Drawing Sheets

U.S. PATENT DOCUMENTS

| | | | |
|---|---|---|---|
| 5,418,912 A | 5/1995 | Christenson | 395/200 |
| 5,448,566 A | 9/1995 | Richter et al. | 370/94.1 |
| 5,485,579 A | 1/1996 | Hitz et al. | 395/200.12 |
| 5,506,966 A | 4/1996 | Ban | 395/250 |
| 5,511,169 A | 4/1996 | Suda | 395/280 |
| 5,517,668 A | 5/1996 | Szwerinski et al. | 395/800 |
| 5,524,250 A | 6/1996 | Chesson et al. | 395/775 |
| 5,535,375 A | 7/1996 | Eshel et al. | 391/500 |
| 5,548,730 A | 8/1996 | Young et al. | 395/280 |
| 5,566,170 A | 10/1996 | Bakke et al. | 370/60 |
| 5,574,919 A | 11/1996 | Netravali et al. | 395/561 |
| 5,588,121 A | 12/1996 | Reddin et al. | 395/200.15 |
| 5,590,328 A | 12/1996 | Seno et al. | 395/675 |
| 5,592,622 A | 1/1997 | Isfeld et al. | 395/200.02 |
| 5,598,410 A | 1/1997 | Stone | 370/469 |
| 5,619,650 A | 4/1997 | Bach et al. | 395/200.01 |
| 5,629,933 A | 5/1997 | Delp et al. | 370/411 |
| 5,633,780 A | 5/1997 | Cronin et al. | 361/220 |
| 5,634,099 A | 5/1997 | Andrews et al. | 395/200.07 |
| 5,634,127 A | 5/1997 | Cloud et al. | 395/680 |
| 5,642,482 A | 6/1997 | Pardillos | 395/200.2 |
| 5,664,114 A | 9/1997 | Krech, Jr. et al. | 395/200.64 |
| 5,671,355 A | 9/1997 | Collins | 395/200.2 |
| 5,678,060 A | 10/1997 | Yokoyama et al. | 709/212 |
| 5,682,534 A | 10/1997 | Kapoor et al. | 395/684 |
| 5,692,130 A | 11/1997 | Shobu et al. | 395/200.12 |
| 5,699,317 A | 12/1997 | Sartore et al. | 395/230.06 |
| 5,699,350 A | 12/1997 | Kraslavsky | 370/254 |
| 5,701,434 A | 12/1997 | Nakagawa | 395/484 |
| 5,701,516 A | 12/1997 | Cheng et al. | 395/842 |
| 5,727,142 A | 3/1998 | Chen | 395/181 |
| 5,742,765 A | 4/1998 | Wong et al. | 395/200 |
| 5,749,095 A | 5/1998 | Hagersten | 711/141 |
| 5,751,715 A | 5/1998 | Chan et al. | 370/455 |
| 5,752,078 A | 5/1998 | Delp et al. | 395/827 |
| 5,758,084 A | 5/1998 | Silverstein et al. | 395/200.58 |
| 5,758,089 A | 5/1998 | Gentry et al. | 395/200.64 |
| 5,758,186 A | 5/1998 | Hamilton et al. | 395/831 |
| 5,758,194 A | 5/1998 | Kuzma | 395/886 |
| 5,768,618 A | 6/1998 | Erickson et al. | 395/829 |
| 5,771,349 A | 6/1998 | Picazo, Jr. et al. | 395/188.01 |
| 5,774,660 A | 6/1998 | Brendel et al. | 395/200.31 |
| 5,778,013 A | 7/1998 | Jedwab | 714/807 |
| 5,778,419 A | 7/1998 | Hansen et al. | 711/112 |
| 5,790,804 A | 8/1998 | Osborne | 709/245 |
| 5,794,061 A | 8/1998 | Hansen et al. | 395/800.01 |
| 5,802,258 A | 9/1998 | Chen | 395/182.08 |
| 5,802,580 A | 9/1998 | McAlpine | 711/149 |
| 5,809,328 A | 9/1998 | Nogales et al. | 395/825 |
| 5,809,527 A | 9/1998 | Cooper et al. | 711/133 |
| 5,812,775 A | 9/1998 | Van Seeters et al. | 395/200.43 |
| 5,815,646 A | 9/1998 | Purcell et al. | 395/163 |
| 5,828,835 A | 10/1998 | Isfeld et al. | 395/200.3 |
| 5,848,293 A | 12/1998 | Gentry et al. | 395/825 |
| 5,872,919 A | 2/1999 | Wakeland et al. | 395/200 |
| 5,878,225 A | 3/1999 | Bilansky et al. | 395/200.57 |
| 5,892,903 A | 4/1999 | Klaus | 395/187.01 |
| 5,898,713 A | 4/1999 | Melzer et al. | 371/53 |
| 5,913,028 A | 6/1999 | Wang et al. | 395/200.33 |
| 5,920,566 A | 7/1999 | Hendel et al. | 370/401 |
| 5,930,830 A | 7/1999 | Mendelson et al. | 711/171 |
| 5,931,918 A | 8/1999 | Row et al. | 709/300 |
| 5,935,205 A | 8/1999 | Murayama et al. | 709/216 |
| 5,937,169 A | 8/1999 | Connery et al. | 395/200.8 |
| 5,941,969 A | 8/1999 | Ram et al. | 710/128 |
| 5,941,972 A | 8/1999 | Hoese et al. | 710/129 |
| 5,950,203 A | 9/1999 | Stakuis et al. | 707/10 |
| 5,970,804 A | 10/1999 | Osborne | 395/200.75 |
| 5,987,022 A | 11/1999 | Geiger et al. | 370/349 |
| 5,991,299 A | 11/1999 | Radogna et al. | 370/392 |
| 5,996,013 A | 11/1999 | Delp et al. | 709/226 |
| 5,996,024 A | 11/1999 | Blumenau | 709/301 |
| 6,005,849 A | 12/1999 | Roach et al. | 370/276 |
| 6,009,478 A | 12/1999 | Panner et al. | 710/5 |
| 6,016,513 A | 1/2000 | Lowe | 709/250 |
| 6,021,446 A | 2/2000 | Gentry et al. | 709/303 |
| 6,026,452 A | 2/2000 | Pitts | 710/56 |
| 6,034,963 A | 3/2000 | Minami et al. | 370/401 |
| 6,038,562 A | 3/2000 | Anjur et al. | 707/10 |
| 6,041,058 A | 3/2000 | Flanders et al. | 370/401 |
| 6,041,381 A | 3/2000 | Hoese | 710/129 |
| 6,044,438 A | 3/2000 | Olnowich | 711/130 |
| 6,047,356 A | 4/2000 | Anderson et al. | 711/129 |
| 6,049,528 A | 4/2000 | Hendel et al. | 370/235 |
| 6,057,863 A | 5/2000 | Olarig | 345/520 |
| 6,061,368 A | 5/2000 | Hitzelberger | 370/537 |
| 6,065,096 A | 5/2000 | Day et al. | 711/114 |
| 6,067,569 A | 5/2000 | Khaki et al. | 709/224 |
| 6,070,200 A | 5/2000 | Gates et al. | 710/20 |
| 6,078,733 A | 6/2000 | Osborne | 395/200.8 |
| 6,097,734 A | 8/2000 | Gotesman et al. | 370/474 |
| 6,101,555 A | 8/2000 | Goshey et al. | 709/321 |
| 6,111,673 A | 8/2000 | Chang et al. | 359/123 |
| 6,115,615 A | 9/2000 | Ota et al. | 455/553 |
| 6,122,670 A | 9/2000 | Bennett et al. | 709/236 |
| 6,141,701 A | 10/2000 | Whitney | 710/5 |
| 6,141,705 A | 10/2000 | Anand et al. | 710/15 |
| 6,145,017 A | 11/2000 | Ghaffari | 710/5 |
| 6,157,944 A | 12/2000 | Pedersen | |
| 6,157,955 A | 12/2000 | Narad et al. | 709/228 |
| 6,172,980 B1 | 1/2001 | Flanders et al. | 370/401 |
| 6,173,333 B1 | 1/2001 | Jolitz et al. | |
| 6,181,705 B1 | 1/2001 | Branstad et al. | 370/392 |
| 6,202,105 B1 | 3/2001 | Gates et al. | 710/20 |
| 6,223,242 B1 | 4/2001 | Sheafor et al. | 710/132 |
| 6,226,680 B1 | 5/2001 | Boucher et al. | 709/230 |
| 6,246,683 B1 | 6/2001 | Connery et al. | 370/392 |
| 6,247,060 B1 | 6/2001 | Boucher et al. | 709/238 |
| 6,279,051 B1 | 8/2001 | Gates et al. | 710/20 |
| 6,289,023 B1 | 9/2001 | Dowling et al. | 370/419 |
| 6,298,403 B1 | 10/2001 | Suri et al. | 710/100 |
| 6,324,649 B1 | 11/2001 | Eyres et al. | 713/202 |
| 6,334,153 B2 | 12/2001 | Boucher et al. | 709/230 |
| 6,343,360 B1 | 1/2002 | Feinleib | 713/1 |
| 6,345,301 B1 | 2/2002 | Burns et al. | 709/230 |
| 6,345,302 B1 | 2/2002 | Bennett et al. | 709/236 |
| 6,356,951 B1 | 3/2002 | Gentry et al. | 709/250 |
| 6,370,599 B1 | 4/2002 | Anand et al. | 710/15 |
| 6,385,647 B1 | 5/2002 | Willis et al. | 709/217 |
| 6,389,468 B1 | 5/2002 | Muller et al. | 709/226 |
| 6,389,479 B1 | 5/2002 | Boucher | 709/243 |
| 6,393,487 B2 | 5/2002 | Boucher et al. | 709/238 |
| 6,421,742 B1 | 7/2002 | Tillier | 710/1 |
| 6,421,753 B1 | 7/2002 | Hoese et al. | 710/129 |
| 6,427,169 B1 | 7/2002 | Elzur | 709/224 |
| 6,427,171 B1 | 7/2002 | Craft et al. | 709/230 |
| 6,427,173 B1 | 7/2002 | Boucher et al. | 709/238 |
| 6,434,620 B1 | 8/2002 | Boucher et al. | 709/230 |
| 6,434,651 B1 | 8/2002 | Gentry, Jr. | 710/260 |
| 6,449,656 B1 | 9/2002 | Elzur et al. | 709/236 |
| 6,453,360 B1 | 9/2002 | Muller et al. | 709/250 |
| 6,470,415 B1 | 10/2002 | Starr et al. | 711/104 |
| 6,473,425 B1 | 10/2002 | Bellaton et al. | 370/392 |
| 6,480,489 B1 | 11/2002 | Muller et al. | 370/389 |
| 6,487,202 B1 | 11/2002 | Klausmeier et al. | 370/395 |
| 6,487,654 B2 | 11/2002 | Dowling | 712/244 |
| 6,490,631 B1 | 12/2002 | Teich et al. | 709/250 |
| 6,502,144 B1 | 12/2002 | Accarie | 710/8 |
| 6,523,119 B2 | 2/2003 | Pavlin et al. | 713/192 |
| 6,526,446 B1 | 2/2003 | Yang et al. | 709/230 |
| 6,570,884 B1 | 5/2003 | Connery et al. | 370/419 |
| 6,587,875 B1 * | 7/2003 | Ogus | 709/223 |
| 6,591,302 B2 | 7/2003 | Boucher et al. | 709/230 |
| 6,591,310 B1 | 7/2003 | Johnson | 710/3 |

| | | | |
|---|---|---|---|
| 6,648,611 B2 | 11/2003 | Morse et al. | 417/310 |
| 6,650,640 B1 | 11/2003 | Muller et al. | 370/392 |
| 6,657,757 B1 | 12/2003 | Chang et al. | 359/124 |
| 6,658,480 B2 | 12/2003 | Boucher et al. | 709/239 |
| 6,678,283 B1 | 1/2004 | Teplitsky | 370/463 |
| 6,681,364 B1 | 1/2004 | Calvignac et al. | 714/776 |
| 6,687,758 B2 | 2/2004 | Craft et al. | 709/250 |
| 6,697,868 B2 | 2/2004 | Craft et al. | 709/230 |
| 6,751,665 B2 | 6/2004 | Philbrick et al. | 709/224 |
| 6,757,746 B2 | 6/2004 | Boucher et al. | 709/250 |
| 6,765,901 B1 | 7/2004 | Johnson et al. | 370/352 |
| 6,807,581 B1 | 10/2004 | Starr et al. | 709/250 |
| 6,842,896 B1 | 1/2005 | Redding et al. | 717/172 |
| 6,912,522 B2 | 6/2005 | Edgar | 707/2 |
| 6,938,092 B2 | 8/2005 | Burns | 709/230 |
| 6,941,386 B2 | 9/2005 | Craft et al. | 709/250 |
| 6,965,941 B2 | 11/2005 | Boucher et al. | 709/230 |
| 6,996,070 B2 | 2/2006 | Starr et al. | 370/252 |
| 7,000,031 B2 * | 2/2006 | Fischer et al. | 709/248 |
| 7,042,898 B2 | 5/2006 | Blightman et al. | 370/463 |
| 7,076,568 B2 | 7/2006 | Philbrick et al. | 709/250 |
| 7,089,326 B2 | 8/2006 | Boucher et al. | 709/242 |
| 7,093,099 B2 | 8/2006 | Bodas et al. | 711/206 |
| 7,124,205 B2 | 10/2006 | Craft et al. | 709/250 |
| 7,133,940 B2 | 11/2006 | Blightman et al. | 710/22 |
| 7,167,926 B1 | 1/2007 | Boucher et al. | 709/250 |
| 7,167,927 B2 | 1/2007 | Philbrick et al. | 709/250 |
| 7,174,393 B2 | 2/2007 | Boucher et al. | 709/250 |
| 7,185,266 B2 | 2/2007 | Blightman et al. | 714/776 |
| 7,191,241 B2 | 3/2007 | Boucher et al. | 709/230 |
| 7,191,318 B2 | 3/2007 | Tripathy et al. | 712/225 |
| 7,237,036 B2 | 6/2007 | Boucher et al. | 709/245 |
| 7,254,696 B2 | 8/2007 | Mittal et al. | 712/210 |
| 7,284,070 B2 | 10/2007 | Boucher et al. | 709/250 |
| 2001/0004354 A1 | 6/2001 | Jolitz | 370/328 |
| 2001/0013059 A1 | 8/2001 | Dawson et al. | 709/217 |
| 2001/0014892 A1 | 8/2001 | Gaither et al. | 707/200 |
| 2001/0014954 A1 | 8/2001 | Purcell et al. | 714/4 |
| 2001/0025315 A1 | 9/2001 | Jolitz | 709/231 |
| 2001/0048681 A1 | 12/2001 | Bilic et al. | 370/389 |
| 2001/0053148 A1 | 12/2001 | Bilic et al. | 370/389 |
| 2002/0073223 A1 | 6/2002 | Darnell et al. | 709/232 |
| 2002/0112175 A1 | 8/2002 | Makofka et al. | 713/200 |
| 2003/0056136 A1 * | 3/2003 | Aweya et al. | 713/400 |
| 2003/0066011 A1 | 4/2003 | Oren | 714/758 |
| 2003/0110344 A1 | 6/2003 | Szezepanek et al. | 711/100 |
| 2003/0165160 A1 | 9/2003 | Minami et al. | 370/466 |
| 2004/0054814 A1 | 3/2004 | McDaniel | |
| 2004/0059926 A1 | 3/2004 | Angelo et al. | 713/168 |
| 2004/0153578 A1 | 8/2004 | Elzur | |
| 2004/0213290 A1 | 10/2004 | Johnson et al. | 370/469 |
| 2004/0246974 A1 | 12/2004 | Gyugyi et al. | 370/395.31 |
| 2006/0239300 A1 * | 10/2006 | Hannel et al. | 370/503 |

FOREIGN PATENT DOCUMENTS

| | | |
|---|---|---|
| WO | WO 98/50852 | 11/1998 |
| WO | WO 99/04343 | 1/1999 |
| WO | WO 99/65219 | 12/1999 |
| WO | WO 00/13091 | 3/2000 |
| WO | WO 01/04770 | 1/2001 |
| WO | WO 01/05107 | 1/2001 |
| WO | WO 01/05116 | 1/2001 |
| WO | WO 01/05123 | 1/2001 |
| WO | WO 01/40960 | 6/2001 |
| WO | WO 01/59966 | 8/2001 |
| WO | WO 01/86430 | 11/2001 |

OTHER PUBLICATIONS

Internet RFC/STD/FYI/BCP Archives article with heading "RFC2140" entitled "TCP Control Block Interdependence", web address http://www.faqs.org/rfcs/rfc2140.html, 9 pages, printed Sep. 20, 2002.

WindRiver article entitled "Tornado: For Intelligent Network Acceleration", copyright Wind River Systems, 2001, 2 pages.

WindRiver White Paper entitled "Complete TCP/IP Offload for High-Speed Ethernet Networks", Copyright Wind River Systems, 2002, 7 pages.

Intel article entitled "Solving Server Bottlenecks with Intel Server Adapters", Copyright Intel Corporation, 1999, 8 pages.

Thia et al. Publication entitled "High-Speed OSI Protocol Bypass Algorithm with Window Flow Control," Protocols for High Speed Networks, pp. 53-68, 1993.

Thia et al. Publication entitled "A Reduced Operational Protocol Engine (ROPE) for a multiple-layer bypass architecture," Protocols for High Speed Networks, pp. 224-239, 1995.

Form 10-K for Exelan, Inc., for the fiscal year ending Dec. 31, 1987 (10 pages).

Form 10-K for Exelan, Inc., for the fiscal year ending Dec. 31, 1988 (10 pages).

Internet pages entitled "Hardware Assisted Protocol Processing", (which Eugene Feinber is working on), 1 page, printed Nov. 25, 1998.

Zilog product Brief entitled "Z85C30 CMOS SCC Serial Communication Controller", Zilog Inc., 3 pages, 1997.

Internet pages of Xpoint Technologies, Inc. entitled "Smart LAN Work Requests", 5 pages, printed Dec. 19, 1997.

Internet pages entitled: Asante and 100BASE-T Fast Ethernet. 7 pages, printed May 27, 1997.

Internet pages entitled: A Guide to the Paragon XP/S-A7 Supercomputer at Indiana University. 13 pages, printed Dec. 21, 1998.

Richard Stevens, "TCP/IP Illustrated, vol. 1, The Protocols", pp. 325-326 (1994).

Internet pages entitled: Northridge/Southbridge vs. Intel Hub Architecture, 4 pages, printed Feb. 19, 2001.

Gigabit Ethernet Technical Brief, Achieving End-to-End Performance. Alteon Networks, Inc., First Edition, Sep. 1996, 15 pages.

Internet pages directed to Technical Brief on Alteon Ethernet Gigabit NIC technology, www.alteon.com, 14 pages, printed Mar. 15, 1997.

VIA Technologies, Inc. article entitled "VT8501 Apollo MVP4", pp. i-iv, 1-11, cover and copyright page, revision 1.3, Feb. 1, 2000.

iReady News Archives article entitled "iReady Rounding Out Management Team with Two Key Executives", http://www.ireadyco.com/archives/keyexec.html, 2 pages, printed Nov. 28, 1998.

"Toshiba Delivers First Chips to Make Consumer Devices Internet-Ready Based On iReady's Design," Press Release Oct. 1998, 3 pages, printed Nov. 28, 1998.

Internet pages from iReady Products, web sitehttp://www.ireadyco.conn/products,html, 2 pages, downloaded Nov. 25, 1998.

iReady News Archives, Toshiba, iReady shipping Internet chip, 1 page, printed Nov. 25, 1998.

Interprophet article entitled "Technology", http://www.interprophet.com/technology.html, 17 pages, printed Mar. 1, 2000.

iReady Corporation, article entitled "The I-1000 Internet Tuner", 2 pages, date unknown.

iReady article entitled "About Us Introduction", Internet pages fromhttp://www.iReadyco.com/about.html, 3 pages, printed Nov. 25, 1998.

iReady News Archive article entitled "Revolutionary Approach to Consumer Electronics Internet Connectivity Funded", San Jose, CA, Nov. 20, 1997. 2 pages, printed Nov. 2, 1998.

iReady News Archive article entitled "Seiko Instruments Inc. (SII) Introduces World's First Internet-Ready Intelligent LCD Modules Based on IReady Technology," Santa Clara, CA and Chiba, Japan, Oct. 26, 1998. 2 pages, printed Nov. 2, 1998.

NEWSwatch article entitled "iReady internet Tuner to Web Enable Devices", Tuesday, Nov. 5, 1996, printed Nov. 2, 1998, 2 pages.

EETimes article entitled "Tuner for Toshiba, Toshiba Taps iReady for Internet Tuner", by David Lammers, 2 pages, printed Nov. 2, 1998.

"Comparison of Novell Netware and TCP/IP Protocol Architectures", by J.S. Carbone, 19 pages, printed Apr. 10, 1998.

Adaptec article entitled "AEA-7110C-a DuraSAN product", 11 pages, printed Oct. 1, 2001.

iSCSI HBA article entitled "iSCSI and 2Gigabit fibre Channel Host Bus Adapters from Emulex, QLogic, Adaptec, JNI", 8 pages, printed Oct. 1, 2001.

iSCSI HBA article entitled "FCE-3210/6410 32 and 64-bit PCI-to-Fibre Channel HBA", 6 pages, printed Oct. 1, 2001.
ISCSI.com article entitled "iSCSI Storage", 2 pages, printed Oct. 1, 2001.
"Two-Way TCP Traffic Over Rate Controlled Channels: Effects and Analysis", by Kalampoukas et al., IEEE Transactions on Networking, vol. 6, No. 6, Dec. 1998, 17 pages.
IReady News article entitled "Toshiba Delivers First Chips to Make Consumer Devices Internet-Ready Based on iReady Design", Santa Clara, CA, and Tokyo, Japan, Oct. 14, 1998, printed Nov. 2, 1998, 3 pages.
Internet pages of InterProphet entitled "Frequently Asked Questions", by Lynne Jolitz, printed Jun. 14, 2000, 4 pages.
"File System Design For An NFS-File Server Appliance", Article by D. Hitz, et al., 13 pages.
Adaptec Press Release article entitled "Adaptec Announces EtherStorage Technology", 2 pages, May 4, 2000, printed Jun. 14, 2000.
Adaptec article entitled "EtherStorage Frequently Asked Questions", 5 pages, printed Jul. 19, 2000.
Adaptec article entitled "EtherStorage White Paper", 7 pages, printed Jul. 19, 2000.
CIBC World Markets article entitled "Computers; Storage", by J. Berlino et al., 9 pages, dated Aug. 7, 2000.
Merrill Lynch article entitled "Storage Futures", by S. Milunovich, 22 pages, dated May 10, 2000.
CBS Market Watch article entitled "Montreal Start-Up Battles Data Storage Botttleneck", by S. Taylor, dated Mar. 5, 2000, 2 pages, printed Mar. 7, 2000.
Internet-draft article entitled "SCSI/TCP (SCSI over TCP)", by J. Satran et al., 38 pages, dated Feb. 2000, printed May 19, 2000.
Internet pages entitled Technical White Paper-Xpoint's Disk to LAN Acceleration Solution for Windows NT Server, printed Jun. 5, 1997, 15 pages.
Jato Technologies article entitled Network Accelerator Chip Architecture, twelve-slide presentation, printed Aug. 19, 1998, 13 pages.
EETimes article entitled Enterprise System Uses Flexible Spec, dated Aug. 10, 1998, printed Nov. 25, 1998, 3 pages.
Internet pages entitled "Smart Ethernet Network Interface Cards", which Berend Ozceri is developing, printed Nov. 25, 1998, 2 pages.
Internet pages of Xaqti corporation entitled "GigaPower Protocol Processor Product Review," printed Nov. 25, 1999, 4 pages.
U.S. Appl. No. 60/283,896, Titled: CRC Calculations for Out of Order PUDs, filed Apr. 12, 2003, Inventor: Amit Oren, Assignee: Siliquent Technologies Ltd.
Internet pages entitled "DART: Fast Application Level Networking via Data-Copy Avoidance," by Robert J. Walsh, printed Jun. 3, 1999, 25 pages.
Andrew S. Tanenbaum, Computer Networks, Third Edition, 1996, ISBN 0-13-349945-6.
Rice University article entitled "LRP: A Network Subsystem Architecture for Server Systems", by P. Druschel and G. Banga, 14 pages.
Internet RFC/STD/FYI/BCP Archives article with heading "RFC2140" entitled "TCP Control Block Interdependence", web address http://www.faqs.org/ftp/rfc/pdf/rfc2140.txt.pdf, 11 pages, Apr. 1997.
WindRiver article entitled "Tornado: For Intelligent Network Acceleration", copyright Wind River Systems, 2001, 2 pages.
WindRiver White Paper entitled "Complete TCP/IP Offload for High-Speed Ethernet Networks", Copyright Wind River Systems, 2002, 7 pages.
Intel article entitled "Solving Server Bottlenecks with Intel Server Adapters", Copyright Intel Corporation, 1999, 8 pages.
Schwaderer et al., IEEE Computer Society Press publication entitled, "XTP in VLSI Protocol Decomposition for ASIC Implementation", from 15th Conference on Local Computer Networks, 5 pages, Sep. 30-Oct. 3, 1990.
Beach, Bob, IEEE Computer Society Press publication entitled, "UltraNet: An Architecture for Gigabit Networking", from 15th Conference on Local Computer Networks, 18 pages, Sep. 30-Oct. 3, 1990.
Chesson et al., IEEE Syposium Record entitled, "The Protocol Engine Chipset", from Hot Chips III, 16 pages, Aug. 26-27, 1991.
Maclean et al., IEEE Global Telecommunications Conference, Globecom '91, presentation entitled, "An Outboard Processor for High Performance Implementation of Transport Layer Protocols", 7 pages, Dec. 2-5, 1991.
Ross et al., IEEE article entitled "FX1000: A high performance single chip Gigabit Ethernet NIC", from Compcon '97 Proceedings, 7 pages, Feb. 23-26, 1997.
Strayer et al., "Ch. 9: The Protocol Engine" from XTP: The Transfer Protocol, 12 pages, Jul. 1992.
Publication entitled "Protocol Engine Handbook", 44 pages, Oct. 1990.
Koufopavlou et al., IEEE Global Telecommunications Conference, Globecom '92, presentation entitled, "Parallel TCP for High Performance Communication Subsystems", 7 pages, Dec. 6-9, 1992.
Lilienkamp et al., Publication entitled "Proposed Host-Front End Protocol", 56 pages, Dec. 1984.
Thia, Y.H. Publication entitled "A Reduced Operational Protocol Engine (ROPE) for a multiple-layer bypass architecture", *Protocols for High Speed Networks*, pp. 224-239, 1995.
U.S. Appl. No. 60/053,240, Titled: TCP/IP Network Accelerator and Method of Use, filed Jul. 18, 1997, Inventors: Jolitz et al., Assignee: InterProphet LLC.
Thia, Y.H. Publication entitled "High-Speed OSI Protocol Bypass Algorithm with Window Flow Control", *Protocols for High Speed Networks*, pp. 53-68, 1993.
Jacobson, V. Publication entitled "TCP Extensions for High Performance", *Network Working Group*, 37 pages, May 1992.

* cited by examiner

TCP TIMESTAMP SYNCHRONIZATION FOR NETWORK CONNECTIONS THAT ARE OFFLOADED TO NETWORK INTERFACE DEVICES

BACKGROUND

Computer networks have become an essential part of modern life. The convenience and efficiency of providing information, communication or computational power to individuals at their personal computer or other end user device has led to rapid growth of network computing, including internet as well as intranet systems and applications. Computer Networks, Third Edition (1996) by Andrew S. Tanenbaum, which is incorporated by reference herein, describes computer networks in detail.

Most computer network communication uses a layered software architecture for moving information between host computers connected to the network. The layers help to segregate information into manageable pieces. The rules and conventions for each layer are called the protocol of that layer.

One widely implemented reference model of a layered architecture for network computer communication is called TCP/IP. TCP denotes Transport Control Protocol, and IP denotes Internet Protocol. TCP/IP is described in detail in TCP/IP Illustrated, Volume 1: The Protocols (1994) by W. Richard Stevens and in TCP/IP Illustrated, Volume 2: The Implementation (1995) by Gary R. Wright and W. Richard Stevens, both of which are incorporated by reference herein.

TCP transmits data over a TCP connection in packages called segments; each segment comprises many bytes of data plus a header of control information. To ensure reliable transmission of data, TCP must recover from data that is damaged, lost, duplicated, or delivered out of order by the internet communication system. TCP assigns a sequence number to each byte transmitted and uses that sequence number in various procedures that guarantee reliability.

When TCP sends a segment, it starts a timer and waits for the other end to acknowledge reception of the segment. If an acknowledgment is not received before the end of the timeout interval, the sender concludes that the segment was lost and retransmits the segment. If the lost segment later arrives at the receiver, it represents a duplicate of the retransmitted segment. Any such old duplicate segment must be identified and discarded or it will corrupt the data transmission.

A sender must know how long an interval to wait for an acknowledgment before concluding that a segment has timed out. The time required to send a segment and receive an acknowledgment, called the round-trip time (RTT), will be greater on a busy connection, so the sender must adjust its timeout interval to reflect changes in network traffic. TCP continually modifies the timeout interval using a statistical analysis of RTTs for segments transmitted recently.

TCP achieves faster rates of data transmission by sending multiple segments before waiting for an acknowledgement. Because segments are not acknowledged individually, the measurement of RTT is not very accurate. The TCP Timestamps option provides a means to achieve more accurate measurement of RTT. This option is described in RFC 1323 is incorporated by reference herein.

The TCP Timestamps option allows the sender to place a timestamp value in every segment. The receiver reflects this value in the acknowledgement, allowing the sender to calculate by a single subtract operation an accurate RTT for each segment. This is called the RTTM (Round-Trip Time Measurement) mechanism.

TCP is a symmetric protocol, allowing data to be sent at any time in either direction, and therefore timestamp echoing may occur in either direction. For simplicity and symmetry, RFC 1323 specifies that timestamps should always be sent and echoed in both directions. For efficiency, RFC 1323 combines the timestamp and timestamp reply fields into a single TCP Timestamps option field which is part of the header for a TCP segment. Use of the TCP Timestamp option is not mandatory; the hosts negotiate the use of the Timestamp option during establishment of the TCP connection.

The timestamp value to be sent in a Timestamps option is to be obtained from a (virtual) clock that RFC 1323 calls the "timestamp clock". The values of the timestamp clock must be at least approximately proportional to real time, in order to measure actual RTT.

In addition to allowing more accurate RTT calculations, the Timestamps option makes possible a simple mechanism to reject old duplicate segments. As noted above, old duplicate segments must be rejected so that they do not corrupt data transmission. The mechanism for identifying and rejecting old duplicate segments is called PAWS (Protect Against Wrapped. Sequence numbers) and is described in RFC 1323.

PAWS assumes that every received TCP segment (including data and acknowledgement segments) contains a timestamp whose values are monotone non-decreasing in time. The basic idea of PAWS is that a segment can be discarded as an old duplicate if it is received with a timestamp less than (ie earlier than) some timestamp recently received on the connection. In both the PAWS and the RTT mechanism, the "timestamps" are 32-bit unsigned integers in a modular 32-bit space. Thus, "less than" is defined the same way it is for TCP sequence numbers, and the same implementation techniques apply. If s and t are timestamp values, s<t if $0<(t-s)<2^{**}31$, computed in unsigned 32-bit arithmetic.

RTTM was specified in a symmetrical manner, so that sender timestamps are carried in both data and acknowledgement segments and are echoed in separate fields carried in returning acknowledgement or data segments. PAWS submits all incoming segments to the same test, and therefore protects against duplicate acknowledgement segments as well as data segments.

TCP connections demand significant processing power from a host computer. To reduce the processing load on a host, TCP connections may be offloaded to a network interface device (NID), such as a network interface card, a port that handles specific connections on a multiport card, or an auxiliary processor for a CPU. U.S. Pat. Nos. 6,226,680, 6,434,620, 6,427,171 and 6,807,581, which are incorporated by reference herein, describe devices and methods for network communication wherein the host allocates some of the most common and time consuming network processes to the NID ("fast-path"), while retaining the ability to handle less time intensive and more varied processing on the host stack ("slow-path"). Commonly, multiple NIDs may be coupled to single host.

In a typical embodiment, the host initiates a TCP connection and then transfers the connection to the NID, which has specialized hardware to perform the data transfer portion of the TCP protocol. If the NID encounters a problem, or if the host decides to take control of the connection, the connection is transferred back to the host. After the host solves the problem or performs some other action concerning the connection, the host may then return the connection to the NID to continue the data transfer. A particular TCP connection may "migrate" back and forth several times between the host and the NID before data transfer is completed and the connection is closed.

SUMMARY

A TCP connection offloaded to a NID presents significant challenges when that connection is using the TCP timestamp option. For RTT measurement and PAWS to work correctly, the output segments on a connection must be sent with monotonically non-decreasing timestamps; in other words, a segment sent later should have a higher timestamp value than a segment sent earlier. If this requirement is not met, accurate calculation of RTT is impossible. Furthermore, the PAWS mechanism will assume that segments with lower timestamp values are old duplicates and will discard those segments. These erroneous discards will cause excessive retransmissions, leading to very poor performance and possibly dropped connections.

Timestamp values that do not increase monotonically can occur when a TCP connection migrates from a host to a NID or vice versa. For example, if a connection migrates from a host to a NID, and the NID clock is behind (slower than) the host clock, the NID might transmit segments with timestamp values that are lower (earlier) than the timestamp values of segments sent previously by the host.

One possible solution to this problem is to provide each connection with its own timestamp timer. This solution has two disadvantages: 1) it increases overhead because of the need to store additional TCP state variables, and 2) the host or NID must maintain and increment a separate timer for each connection using timestamps.

The present invention provides a better solution, which is to synchronize the timestamp clocks for the host and the NID so as to avoid poor performance and dropped connections. In accordance with one embodiment of the present invention, the host and the NID each maintain separate timestamp clocks which are synchronized by transfer of a clock value. The NID or host receives the transferred TCP connection and the transferred clock value, and decides whether to update its own clock to equal the transferred clock value, the decision being guided by the requirement to never allow the timestamp clock to run backward. Methods are disclosed for initializing the NID clock and for preventing acceleration of the host and NID timestamp clocks.

DESCRIPTION OF THE PREFERRED EMBODIMENTS

Figure 1:
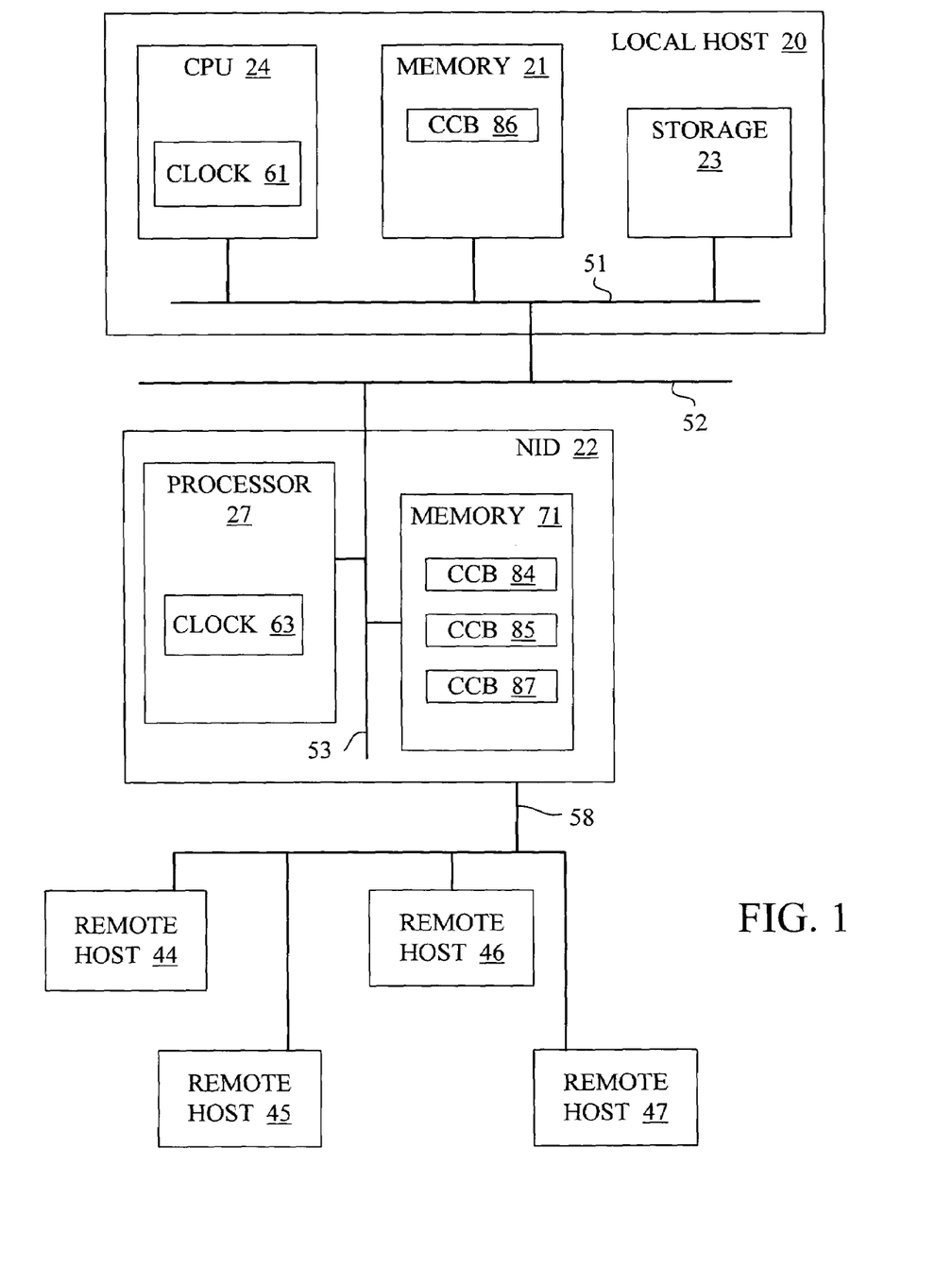
FIG. 1 is a schematic plan view of a host having a NID connected to remote hosts via a network.

Referring now to FIG. 1, the present invention can operate in an environment including a host computer shown generally at 20 connected to remote hosts 44-47 via a network 58. The host computer 20 includes a central processing unit (CPU) 24, a memory 21, and storage 23, while a network interface device (NID) 22 provides an interface between the host and the network 58. A host is defined in the present invention to be a device including a CPU, a memory and instructions for running the CPU. Note that, although storage 23 is shown separately from memory 21, both may be simply be separate categories of the same memory. The network 58 is a medium for transmission of information from one computer to another, such as conductive wires, optical fibers or wireless space, including any supporting hardware or software such as switches and routers. Network implementations include local area networks, wide area networks, telecommunication networks and the Internet.

The NID 22 includes a processor 27 and a memory 71. The NID 22 provides a network interface that may be added with an adapter card, for example, or integrated as a part of the host computer. The NID 22 is connected to the host 20 by a conventional bus 52, which may be a host bus or an input/output (I/O) bus such as a peripheral component interconnect (PCI) bus. For the situation in which bus 52 is an I/O bus, the internal NID memory bus 53 and the host memory bus 51 may be coupled to I/O bus 52 with conventional interface mechanisms. Although FIG. 1 illustrates an embodiment with a single NID, more NIDs are possible.

When a TCP connection migrates from a host to a NID or vice versa, a communication control block (CCB) can provide a mechanism for that migration. In FIG. 1, host memory 21 includes CCB 86 and NID memory 71 includes CCBs 84, 85 and 87. A host and a NID each may contain zero or a variable number of CCBs, with one CCB for each TCP connection that is currently being handled by the host or the NID.

A CCB is a data structure containing the set of variables used to represent the state of a particular TCP connection. A portion of the CCB corresponds to most if not all variables of a Transmission Control Block (TCB), whereas other variables are used by the connection migration mechanism. A list of variables for a conventional TCB can be found in a textbook entitled TCP/IP Illustrated, Volume 2 (7th Edition, 1999) by Gary R. Wright and W. Richard Stevens, which is incorporated by reference herein, on pages 803-805. The migration mechanism can vary and need not include transfer of all of the CCB variables.

The TCP Timestamp option uses a "timestamp clock" or timer which is described in RFC 1323. In FIG. 1, the CPU 24 for the host 20 includes a clock 61, and the processor 27 for the NID 22 includes a clock 63. Clocks 61 and 63 ordinarily will have the same resolution (time elapsed between ticks), and the resolution typically is about 200 milliseconds.

Figure 2:
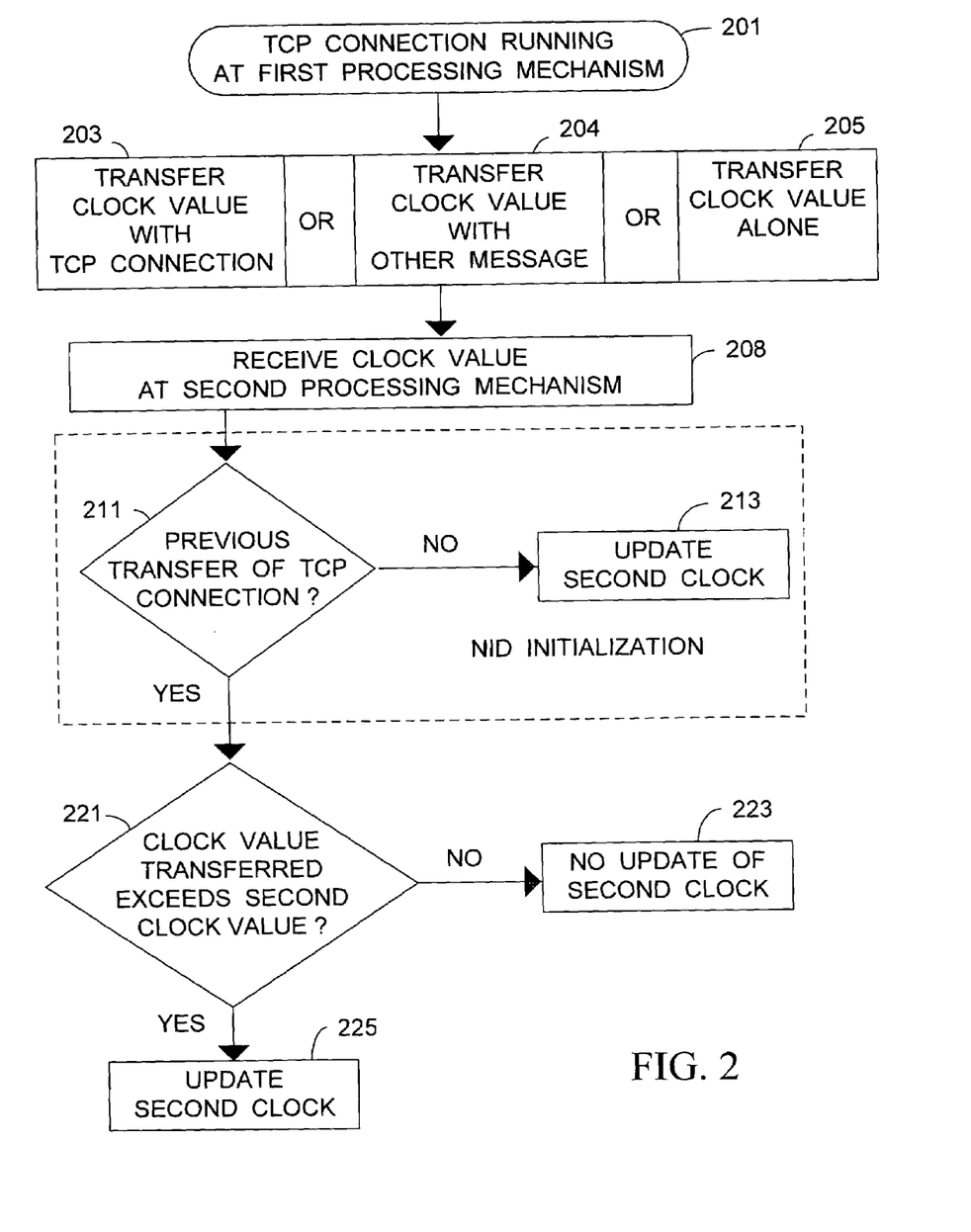
FIG. 2 is a diagram of a general method employed to synchronize timestamp clocks for the host and the NID.

FIG. 2 illustrates the steps involved in synchronizing clocks 61 and 63 during migration of a TCP connection which is using the TCP Timestamps option. The synchronization mechanism can work the same for connection migration from a host to a NID or from a NID to a host. Thus, FIG. 2 uses the general terms "first processing mechanism" and "second processing mechanism"; each of these terms can represent either the host or the NID.

In an initial state (step 201), a TCP connection is already running at the first processing mechanism, having been established by the host 20. In one embodiment of the invention, the first step of synchronizing the clocks is for the first processing mechanism to transfer its clock value to the second processing mechanism. For efficiency, the clock value is typically "piggybacked" on a message that transfers a TCP connection (step 203); the message contains the CCB, which represents the migrating connection, plus the clock value. Alternatively, the clock value may be piggybacked on some other message (step 204), or it may be transferred as an independent message (step 205).

There is a special case for initial synchronization of clocks 61 and 63. After the second processing mechanism receives the clock value (step 208), it checks whether any TCP connection was previously transferred (step 211). If not, the receiving NID updates (step 213) its clock 63 to have the same value as the clock value received from the host, without performing any additional tests concerning clock values.

When a clock value is sent from the first processing mechanism to the second processing mechanism, that received clock value may be ahead of (greater than) or behind (less than) the current value of the second clock for the second processing mechanism. The PAWS mechanism assumes, however, that timestamp values never decrease; the timestamp clock may not run backwards. So the second processing mechanism checks whether the value received is greater than the current value for the second clock (step 221), before updating the second clock to equal the value received (step 225).

If a connection migrates more than once between establishment and closing of the connection, then synchronization of clocks may occur at each migration. At clock update, the updated clock will be "nudged" ahead slightly. The repeated "nudging" may cause small increases in estimated RTTs. This small inaccuracy is preferable to enduring the many problems that result when the timestamp clock can run backwards.

Acceleration of timestamp clocks can result from the combination of out of phase clocks and clock updates caused by connection migration. TABLE 1 shows an example of clock acceleration where a single connection moves between host and NID. In this example, the clocks for the host and NID each tick once every 200 milliseconds (msec). The clocks are out of phase, however; the host clock ticks at time 100 msec, while the NID clock ticks at time 200 msec. After 600 msec has elapsed, each clock should have a value of 3. In fact, the NID clock has the value 5 and the host clock has the value 4. If the clocks have the same resolution but are out of phase, as much as a two-fold acceleration can occur, for example if the connection migrated between every tick of the out-of-phase clocks.

Although such acceleration is unlikely to occur due to a single migrating connection, it may be more problematic for the situation in which multiple migrating connections exist. For example, in some server implementations each NID may maintain thousands of connections. Moreover, for an embodiment in which multiple NIDs that share the same clock are coupled to a single host, as may be the case for a multiport card in which each port handles specific connections, the problem of timestamp clock acceleration may be exacerbated. It is desirable to prevent acceleration because acceleration of the timestamp clock will make RTT measurements less accurate.

TABLE 1

| EVENT | CLOCK VALUE AT HOST | CLOCK VALUE AT NID |
| --- | --- | --- |
| start | 0 | 0 |
| 100 msec elapsed | 1* | 0 |
| 200 msec elapsed | 1 | 1* |
| 300 msec elapsed | 2* | 1 |
| connection migrates from host to NID | 2 | 2 |
| 400 msec elapsed | 2 | 3* |
| connection migrates from NID to host | 3 | 3 |
| 500 msec elapsed | 4* | 3 |
| connection migrates from host to NID | 4 | 4 |
| 600 msec elapsed | 4 | 5* |

*indicates normal clock tick, independent of connection migration

Figure 3:
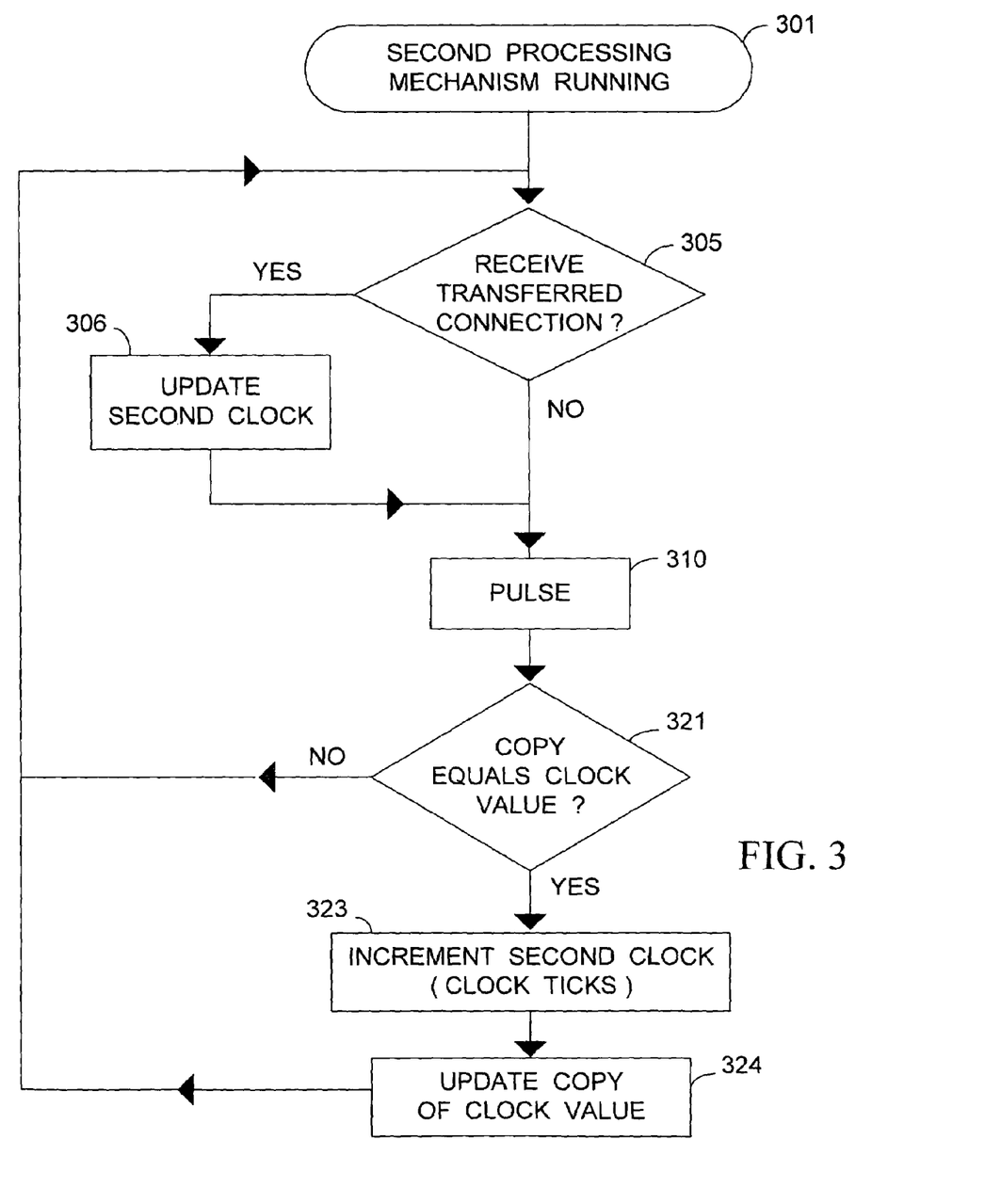
FIG. 3 is a diagram of a general method employed to prevent acceleration of timestamp clocks for the host and the NID.

FIG. 3 illustrates a method for preventing acceleration of timestamp clocks. Normally the timestamp clock ticks (is incremented) in response to a periodic pulse or signal 310. Before the clock ticks, however, the processing mechanism checks whether the clock has been updated (step 306) by some event, such as a connection migration (305), that is independent of the pulse or signal. The processing mechanism detects such an independent update event by comparing (step 321) the value of the timestamp clock with a copy of that value which was saved at the time of the most recent clock tick. If the current clock value equals the saved copy of the clock value, then it is safe to increment the clock (step 323). After the clock is incremented, the saved copy of the clock value is set to equal the new clock value (step 324).

Although we have described in detail various embodiments of the present invention, other embodiments and modifications will be apparent to those of skill in the art in light of this text and accompanying drawings. Therefore, the present invention is to be limited only by the following claims, which are intended to include all such embodiments, modifications and equivalents.

The invention claimed is:

1. A method for communication over a network between a local host and a remote host, the local host having a first processing mechanism and a second processing mechanism, the first processing mechanism having a first clock and the second processing mechanism having a second clock, the method comprising:
   establishing a transport transmission control protocol (TCP) connection between the local host and the remote host;
   transferring the TCP connection from the first processing mechanism to the second processing mechanism; and
   transferring a clock value from the first processing mechanism to the second processing mechanism, thereby synchronizing the first and second clocks, wherein synchronizing the first and second clocks comprises:
   comparing the clock value transferred by the first processing mechanism with a second clock value for the second processing mechanism; and
   choosing, based upon the comparing, whether to update the second clock.

2. The method of claim 1, wherein synchronizing the first and second clocks comprises:
   updating the second clock, based upon the clock value transferred by the first processing mechanism.

3. The method of claim 1, wherein synchronizing the first and second clocks comprises:
   determining whether a second TCP connection was previously transferred from the first processing mechanism to the second processing mechanism; and
   if no second TCP connection was previously transferred, updating the second clock, based upon the clock value transferred by the first processing mechanism.

4. The method of claim 1, wherein synchronizing the first and second clocks comprises: updating the second clock when the comparing indicates that the clock value transferred by the first processing mechanism is greater than the second clock value.

5. The method of claim 1, wherein synchronizing the first and second clocks comprises:
   determining whether the clock value transferred by the first processing mechanism is greater than a second clock value for the second processing mechanism; and
   choosing, based upon the determining, whether to update the second clock.

6. The method of claim 1, wherein transferring the clock value from the first processing mechanism to the second processing mechanism comprises:
   piggybacking the transfer of the clock value on a transfer of other information from the first processing mechanism to the second processing mechanism.

7. The method of claim 1, wherein transferring the clock value from the first processing mechanism to the second processing mechanism comprises:
   piggybacking the transfer of the clock value on the transfer of the TCP connection.

8. The method of claim 1, further comprising:
   determining whether a second clock value for the second processing mechanism equals the value of a saved copy of the second clock value;
   choosing, based upon the determining, whether to increment the second clock; and
   updating the saved copy by setting it equal to the second clock value.

9. The method of claim 1, further comprising:
   incrementing the second clock, wherein the incrementing occurs only if a second clock value for the second processing mechanism equals the value of a saved copy of the second clock value; and
   updating the saved copy by setting it equal to the second clock value.

10. A system for communication over a network, the system comprising:
    a first processing mechanism that has a first clock;
    a second processing mechanism that has a second clock;
    a Transmission Control Protocol (TCP) connection that has been transferred from the first processing mechanism to the second processing mechanism; and
    a clock value that has been transferred from the first processing mechanism to the second processing mechanism to synchronize the second clock with the first clock, wherein synchronizing the first and second clocks comprises:
    comparing the clock value transferred by the first processing mechanism with a second clock value for the second processing mechanism; and
    choosing, based upon the comparing, whether to update the second clock.

11. The system of claim 10, wherein the first processing mechanism is contained in a computer and the second processing mechanism is contained in a network interface card.

12. The system of claim 10, wherein the first processing mechanism and the second processing mechanism are disposed on a printed circuit board.

13. The system of claim 10, wherein the first clock has been set using a second clock value transferred from the second processing mechanism.

14. The system of claim 10, wherein a message that sends information from the first processing mechanism to the second processing mechanism also includes the transfer of the clock value.

15. The system of claim 10, wherein a message which transfers the TCP connection from the first processing mechanism to the second processing mechanism also includes the transfer of the clock value.

16. The system of claim 10, wherein the TCP connection includes the TCP timestamp option.

17. The system of claim 10, wherein the second processing mechanism further comprises a plurality of TCP connections that reference the second clock.

18. A system for communication over a network, the system comprising:
    a first processing mechanism that has a first clock;
    a second processing mechanism that has a second clock;
    a Transmission Control Protocol (TCP) connection that has been transferred from the first processing mechanism to the second processing mechanism; and
    means for synchronizing the second clock with the first clock, wherein synchronizing the first and second clocks comprises:
    comparing the clock value transferred by the first processing mechanism with a second clock value for the second processing mechanism; and
    choosing, based upon the comparing, whether to update the second clock.

19. The system of claim 18, wherein the TCP connection includes the TCP timestamp option.

20. The system of claim 18, wherein the second processing mechanism further comprises a plurality of TCP connections that reference the second clock.

* * * * *